(No Model.)
A. D. LAGRELLE.
BELT FASTENER.
No. 300,985.          Patented June 24, 1884.
Fig: 1
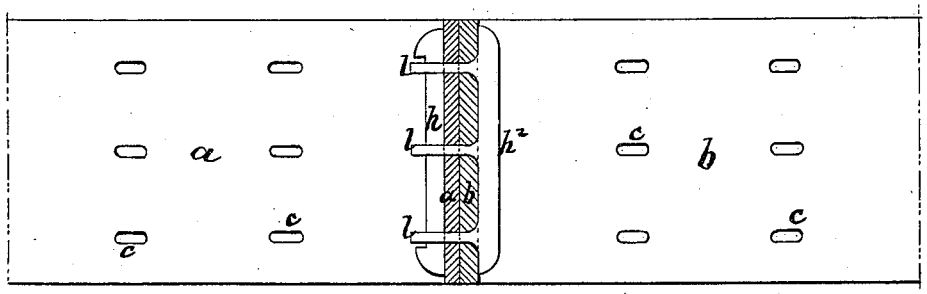
Fig: 2
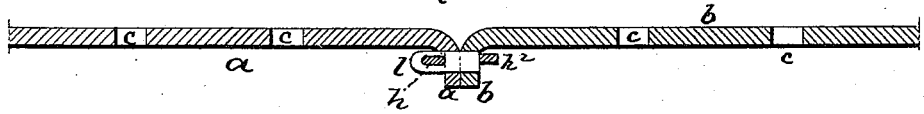
Fig: 3
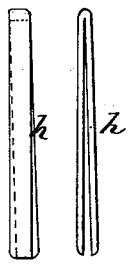
Witnesses
John C. Tunbridge
August Schlarbaum
Inventor:
A. D. Lagrelle
by his attorneys
Briesen & Steele

UNITED STATES PATENT OFFICE.

ALEXANDRE DAMIENS LAGRELLE, OF PARIS, FRANCE.

BELT-FASTENER.

SPECIFICATION forming part of Letters Patent No. 300,985, dated June 24, 1884.

Application filed February 28, 1884. (No model.) Patented in France January 12, 1882, No. 146,814; in Belgium May 23, 1882, No. 58,002; in Italy June 5, 1883, XXXI, 30, and in England January 25, 1884, No. 2,134.

*To all whom it may concern:*

Be it known that I, ALEXANDRE DAMIENS LAGRELLE, a citizen of France, residing at Paris, in the French Republic, have invented new and useful Improvements in Connecting the Ends of Driving Belts or Bands of Machinery, (for which I have obtained a patent in Great Britain for fourteen years, No. 2,134, bearing date January 25, 1884; in France for fifteen years, No. 146,814, dated January 12, 1882; in Belgium for fifteen years, No. 58,002, dated May 23, 1882; in Italy for fifteen years, No. 30, vol. 31, dated June 5, 1883,) of which the following is a specification.

In the drawings, Figure 1 is a plan view of my improved belt-fastener; Fig. 2, a longitudinal section of the same, and Fig. 3 represents a key which may be used in connection with the same.

This invention consists in the use of a bar about as long as the width of the belt or band whose ends are to be connected, and to which bar are firmly secured at right angles a suitable number of rings or loops, which receive a spring-key or other suitable pin to prevent their slipping out of the holes in the belt through which they pass. Into the ends of the belt $a$ $b$ are pierced parallel rows of oblong holes $c$. The object of having more than one of these rows is to be able to shorten or lengthen the belts as may be required. $h$ is a bar about as long as the belt is wide. To this bar are rigidly secured as many projecting loops $l$ $l$ as there are holes transversely in the belt. When it is required to connect the ends of the belt, one of the rows of holes on one end is placed over a row on the other end, so as to allow of the insertion of the loops $l$. Through the projecting free ends of these loops is then passed a spring-key, $h'$, or other suitable locking device, which prevents the loops from slipping out.

By the use of this device a few seconds only are required to shorten or lengthen the belt as may be required, as it is only necessary to pull out the spring-key, remove the loops which are attached to the bar $h$, take a different set of holes in the belt, and again insert the loops and key.

I claim—

The combination of the belt having perforated ends with the bar $h$, provided with loops $l$ and spring-fastener $h'$, which is adapted to be passed through said loops, substantially as herein shown and described.

ALEXANDRE DAMIENS LAGRELLE.

Witnesses:
 A. BLÉTRY,
 EDWARD P. MACLEAN.